United States Patent Office 3,494,305
Patented Feb. 10, 1970

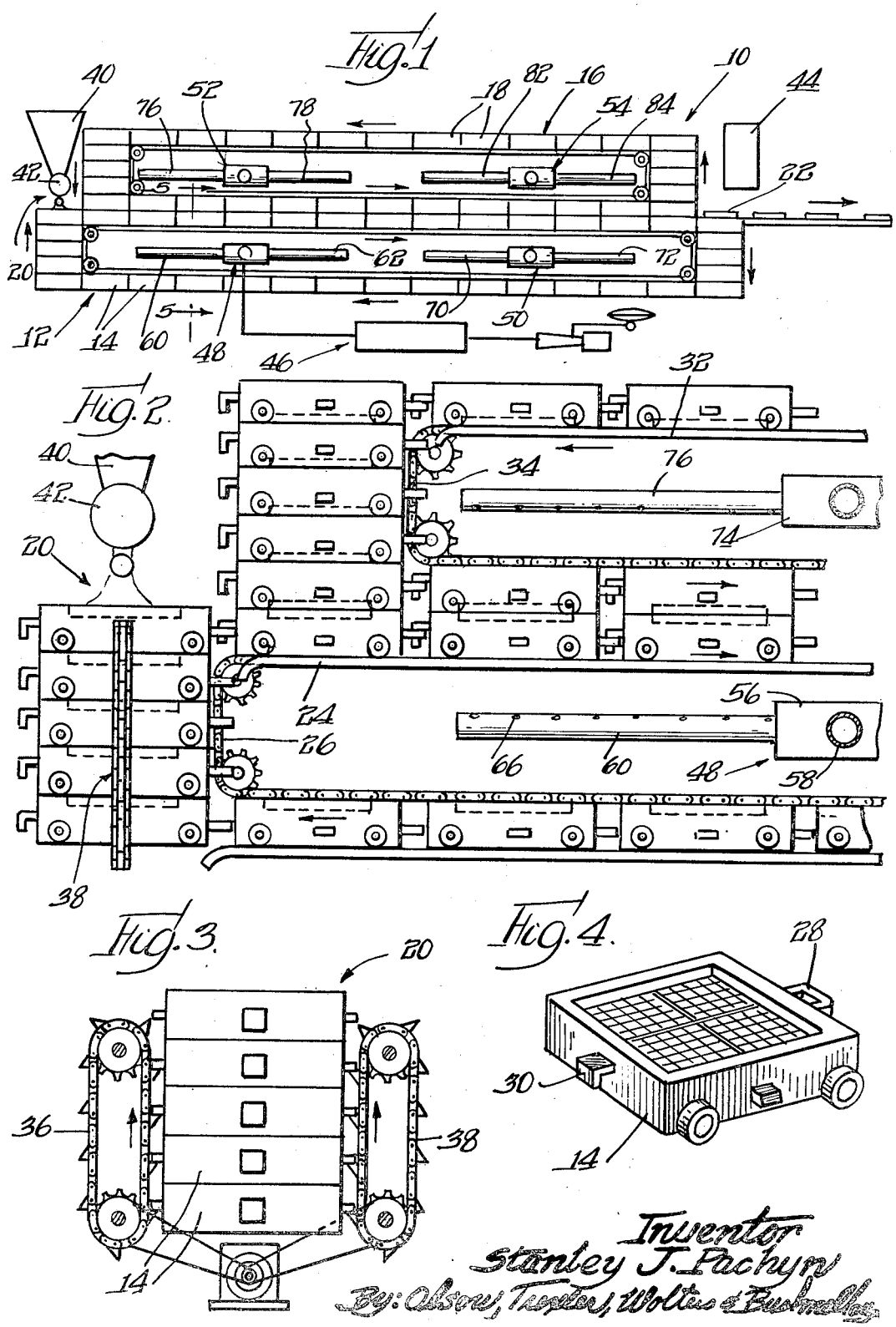

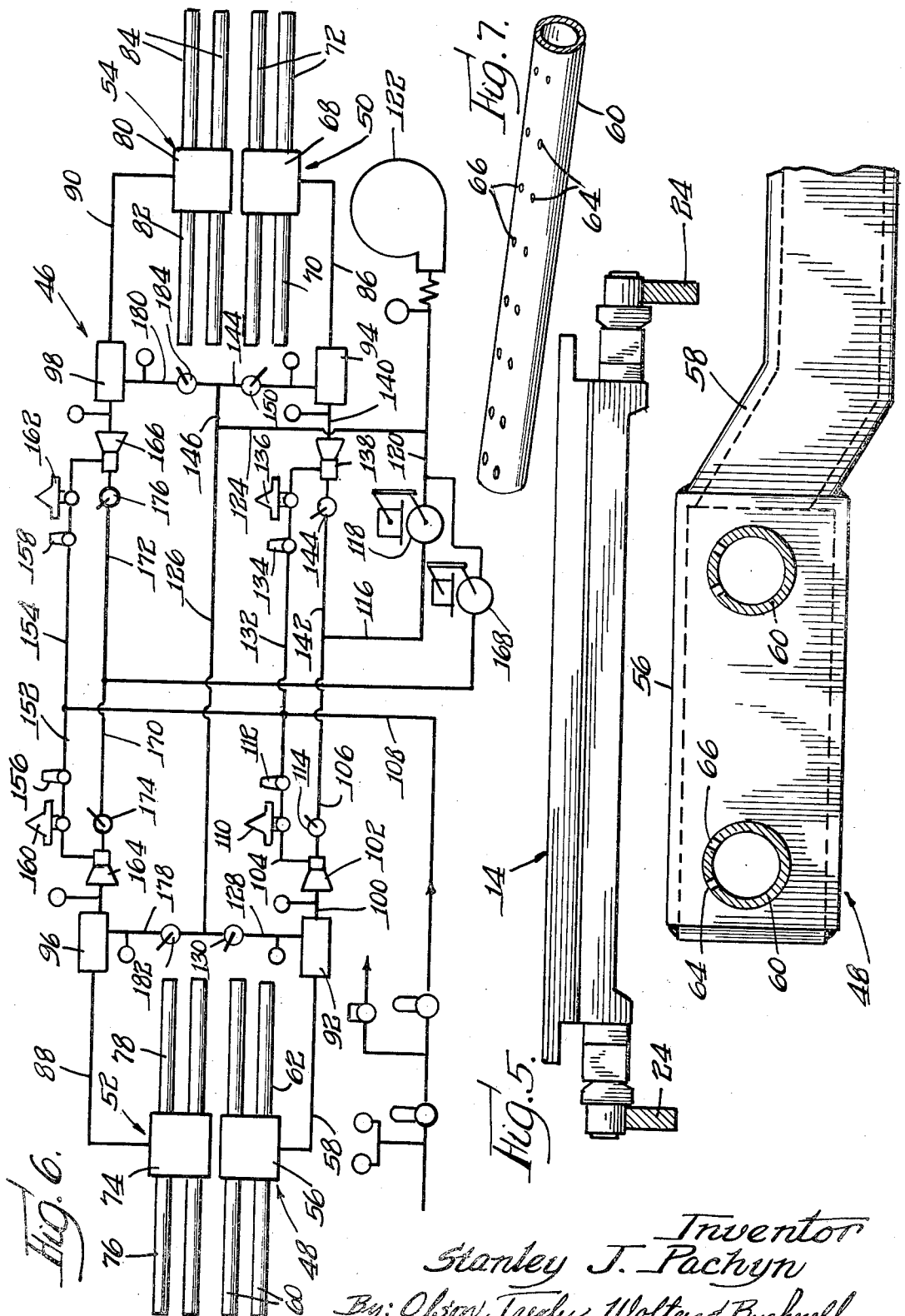

3,494,305
HEATING APPARATUS FOR COOKING FOOD
Stanley J. Pachyn, 10912 S. Western Ave.,
Hazelcrest, Ill. 60643
Filed Mar. 25, 1968, Ser. No. 715,613
Int. Cl. A21b 3/06
U.S. Cl. 107—57          9 Claims

ABSTRACT OF THE DISCLOSURE

There is disclosed a continuous oven for cooking pancakes, waffles and the like having a heating system including a burner and a dilution air providing blower for delivering a mixture of combustion gases and dilution air under pressure to lances adjacent the oven having spaced apart and diverging discharge openings for directing a high volume of the heated gas mixture in the form of high velocity streams against portions of the oven for uniformly heating such portions and cooking the food.

---

The present invention relates to a novel food cooking apparatus, and more specifically to a novel hotplate type apparatus or oven which is usually employed in commercially cooking or baking food products such as waffles, pancakes, biscuits and the like.

Apparatus of the general type contemplated herein frequently include hotplates or gridles which are moved along a path of travel having portions which may be designated as loading, cooking and unloading portions. In order properly to bake or cook the food product, it is essential that the hotplate means be heated to and maintained at a desired substantially uniform temperature. Attempts have been made to accomplish this by placing gas burners directly adjacent the hotplates, but such systems have not always solved the problems of adequate and uniform heating.

It is an important object of the present invention to provide a novel food cooking or baking apparatus having a heating system capable of quickly and uniformly and adequately heating hotplate members or the like over a range of desired temperatures.

A more specific object of the present invention is to provide a novel apparatus of the above described type having means for directing a relatively large volume of high temperature gases along a hotplate or the like of the cooking apparatus in a manner for insuring adequate and uniform heating of the hotplate.

A still further specific object of the present invention is to provide a novel cooking or baking apparatus of the above described type having hotplate members movable along a path of travel, a heat source comprising combustion means and means for mixing dilution air or other gases with the products of combination for obtaining a hot but tempered mixture of gases, and means including elongated lances having a plurality of spaced apart and diverging rows of outlet orifices for directing the hot gas mixture in high volume and at high velocity against the hotplate members of the apparatus for accomplishing uniform and adequate heating.

Other objects and advantages of the present invention will become apparent from the following description and the accompanying drawings wherein:

FIG. 1 is a simplified side elevational view showing an apparatus incorporating features of the present invention;

FIG. 2 is an enlarged fragmentary simplified side elevational view of the apparatus shown in FIG. 1;

FIG. 3 is an end view of the apparatus shown in FIG. 2;

FIG. 4 is a perspective view showing a hotplate member incorporated in the apparatus of FIGS. 1–3;

FIG. 5 is an enlarged fragmentary sectional view taken generally along line 5—5 of FIG. 1;

FIG. 6 is a schematic diagram showing a heating system incorporating features of the present invention and included in the apparatus of FIGS. 1–5; and FIG. 7 is a fragmentary perspective view showing a portion of a lance member included in the apparatus of the present invention.

Referring now more specifically to the drawings wherein like parts are designated by the same numerals throughout the various figures, a food cooking apparatus or baking machine 10 is shown for the purpose of illustrating one embodiment of the present invention. This embodiment is adapted for cooking or baking food items such as waffles. Thus, the apparatus includes a lower continuous series 12 of hotplates 14 and an upper continuous series 16 of complementary hotplates 18. The hotplates are adapted to be moved continuously along endless paths of travel between a loading station 20 and a discharge or unloading station 22. It is to be understood that the hotplate members may be adapted for cooking or baking various food items other than waffles such, for example, as pancakes, biscuits, crumpets and the like. Furthermore, the apparatus may be modified by eliminating the upper series of hotplate members since they are not needed for cooking food items such as pancakes.

The hotplate members and the related supporting and driving mechanisms may be of various known construction and need not be described in detail herein. Thus, it suffices to state that the lower plate members 14 are moved over and along supporting rail means 24 from the loading station 20 to the unloading station 22 by any suitable drive mechanism which may include an endless chain 26 engageable with the hotplate members. Complementary eye and hook elements 28 and 30 are provided on each of the hotplate members 14 for connection with an adjacent hotplate member in a manner which permits these members to be disengaged from each other to be moved downwardly in a stacked condition at the unloading station as shown in FIG. 1. At the bottom of the stack successive plate members are rehooked toegther and then moved back toward the loading station at which they are moved vertically upwardly in a stacked position as shown at the lefthand side of FIGS. 1 and 2.

The upper plate members are similarly formed with complementary eye and hook elements and are supported by suitable track means 32 and driven by a continuous drive mechanism which may include an endless chain 34. The arrangement of the upper hotplate members is such that the lower members are uncovered at the loading and unloading stations. Between these stations, each lower hotplate member is covered by an upper hotplate member resting thereon so as to provide an enclosed chamber in which to cook or bake the food product.

As indicated in FIGS. 2 and 3, endless chain elevator mechanisms 36 and 38 or other suitable means are provided at opposite sides of each of the end stacked portions of both the upper and lower series of hotplate members for vertically moving the hotplate members between the upper and lower courses of their respective series.

Various devices may be mounted at the loading station 20 for introducing a measured increment of the food product batter onto each successive hotplate member. Such means may include a hopper 40 and an associated measuring valve 42. An ejecting mechanism 44 shown schematically in FIG. 1 is provided for removing the finished food items from the hotplates 14 at the end loading station 22.

In accordance with an important feature of the present invention, a system 46 is incorporated in the apparatus for rapidly and uniformly heating the hotplates between the loading and unloading stations and for maintaining the desired cooking or baking temperature. As will be described more in detail below the system comprises means for delivering gases such as heated air at controlled high temperatures and volumes to distributor units 48 and 50 disposed along the lower hotplate members and similar distributor units 52 and 54 mounted along the upper hotplate members. These distributor units are essentially identical to each other and therefore only the unit 48 shown in FIGS. 1, 2, 5 and 6 will be described in detail.

The distributor unit 48 comprises a central manifold 56 connected with an inlet pipe 58. The manifold is disposed so as to extend transversely of the upper course of the continuous series 12 of lower hotplate members 14 at a location closely spaced beneath the undersides of the hotplate members. Hot air lances 60 are connected to one side of the manifold 56 and extend in substantially parallel relationship longitudinally beneath the hotplate member 14. Additional hot air lances 62 are connected to and extend from the opposite side of the manifold 56. The lances 62 are essentially identical to the lances 60 and extend in general parallel relationshp to each other longitudinally beneath the path of travel of the hotplate members 14.

As shown best in FIGS. 2, 5 and 7, outer ends of the hot air lances are closed and each lance has a plurality of rows of apertures 64 and 66 therein. The apertures of each row are spaced from each other longitudinally of their respective lance members and the apertures 64 are spaced circumferentially from the apertures 66. As shown best in FIG. 5, the apertures 64 are disposed for directing jets of hot air so as to diverge in one direction from a vertical plane while the apertures 66 are disposed on the opposite side of the vertical plane for directing jets of hot gases or air diverging in the opposite direction. In other words, the apertures 64 and 66 direct oppositely diverging jets of gases upwardly against the bottom surfaces of the hotplate members 14 and at acute angles to such surfaces so that the gases tend to flow in opposite directions and spread across the hotplate members for promoting even heating. The arrangement of a plurality of the lances in side by side relationship further assures more uniform distribution of the hot gases and even heating of the hotplate members. While in the embodiment shown the lances are arranged in pairs, it is to be understood that additional lances may be connected with each of the manifold members if desired.

As previously indicated, the hot air distributing units 50–54 are essentially identical to the unit 48 and thus need not be described in detail. It suffices to state that the unit 50 includes a manifold 68 and oppositely extending pairs of lances 70 and 72, the unit 52 comprises a manifold 74 and oppositely extending pairs of lances 76 and 78, and the unit 54 has a corresponding manifold 80 and oppositely extending pairs of lances 82 and 84. Of course, the discharge apertures in the lances of the upper units 52 and 54 are arranged for directing the hot gases downwardly against the upwardly facing or disposed sides of the upper hotplate members 18. Air or hot gas supplying conduits 86, 88 and 90 corresponding to the previously mentioned conduit 58 are connected with the manifolds 68, 74 and 80 respectively.

As shown in FIG. 6, the heating system 46 has combined gas heater or combustion and dilution air mixing units 92, 94, 96 and 98 respectively having outlets connected with the conduits 58, 86, 88 and 90. Referring particularly to the unit 92, it is seen that it is connected with a gas line 100 carrying a combustible mixture of gases from a mixing device 102 having an inlet connected with a fuel gas line 104 and an air line 106. The fuel line 104 is connected with a gas supplying conduit 108 and has connected therein a gas pressure regulating valve 110 and a suitably controlled solenoid operated shut-off valve 112.

The air line 106 has an adjustable valve 114 therein for controlling the gas air ratio in the mixing device 102. The air line 106 is connected by a branch line 116 with an electrically controlled shut-off valve 118 which has an inlet side connected to an air supply conduit 120. The conduit 120 is in turn connected to a blower 122 or any other suitable source of a large volume of air under pressure.

The air supply conduit is also connected by branch lines 124, 126 and 128 having an adjustable air regulating valve 130 therein with the heater unit 92. The construction of the unit 92 is known and comprises a burner within a chamber in which the combustible mixture from the supply line 100 is adapted to be burned and an inlet for receiving dilution air from the branch line 128. This dilution air mixes with the extremely hot products of combustion formed within the unit 92 so as to reduce the temperature thereof.

By way of example only, it is contemplated that the ratio of dilution air to hot products of combustion can be adjusted and varied so that the mixture of gases flowing from the unit 92 into the conduit 58 and ultimately out of the lances 60 and 62 may have any desired temperature between about 200° F. and 1500° F. In other words, the temperature of the products of combustion may be reduced by about as much as 50 to 1.

The volume and pressures at which the combustion gases and dilution air are introduced into the burner heater unit 92 are adjusted so that a high pressure drop is obtained across the outlet ports 64 and 66 of the lances for emitting high velocity hot gas streams or jets directed toward the hotplate units in the manner described above. The structure is such that the spacing of the outlet ports of the lances from the surface of the hotplates can be varied from less than one inch to about six inches in order to obtain the most uniform distribution of heat. In addition, the size or diameter of the outlet ports 64 and 66, which are preferably spaced apart at about one inch intervals along the length of the lances, are varied and increases from the manifold end toward the outer end of the lances. The sizes of the ports are such as to promote substantially uniform outlet velocity of the jets emitted from all the ports whereby to effect uniform heating of the hotplate members.

The heater burner units 94, 96 and 98 are connected with fuel gas and air supplies in the same manner as the unit 92. Thus, the heater burner unit 94 is connected with the fuel gas supply conduit 108 by a branch line 132, shut-off valve 134, pressure regulating valve 136, mixing device 138 and conduit 140. The mixing device 138 is connected with the source of combustion air by branch line 142 and adjustable control valve 144. In addition, the burner unit 94 is connected with the source of dilution air by branch lines 146 and 148 and adjustable control valve 150.

The heater burner units 96 and 98 for the upper sets of lances are respectively connected with the fuel gas supply conduits through branch lines 152 and 154, shut-off valves 156 and 158, pressure regulating valves 160 and 162 and air gas mixing devices 164 and 166. The air gas mixing devices are respectively connected with the air supply conduit 120 through a control valve 168, branch lines 170 and 172 and adjustable regulator valves 174 and 176. Dilution air is supplied to the heater burner units 96 and 98 through branch lines 178 and 180 having control valves 182 and 184 therein and respectively connected to air lines 126 and 146.

When baking or cooking a food product in accordance with the present invention, the apparatus is first actuated so that the upper and lower hotplate members are continuously moved around their closed paths of travel. In addition, the heating system is started and adjusted so that high volume high velocity streams of hot gases are impinged in diverging relationship against the exposed opposite sides of the mating upper and lower hotplate members and these gases heat the hotplate members rapidly and uniformly to the desired baking temperature in the manner described above. Since the temperature of these gases is not as extreme as the temperature of a gas flame or the hot products of combustion, relatively large volumes of the gas mixture may be impinged directly against the hotplates for achieving rapid heat transfer and heating of the hotplates without creating localized hot spots. Furthermore, the relatively moderate temperature of the high velocity gas streams enables the heat distribution units or lances to be placed in close proximity to the elements to be heated for minimizing heat losses and increasing the overall efficiency of the system.

When the hotplate members have been raised the desired temperature, measured quantities of the food batter are deposited on successive hotplate members 14 at the loading station 20 whereupon these hotplate members advance toward the right as shown in FIGS. 1 and 2, mate with the upper hotplate members and proceed along their path of travel through the cooking zones. As the loaded hotplate members advance into alignment with the lances, they are rapidly heated to the desired cooking or baking temperature and because of the high volume of the gas mixture which may be directed against the hotplate members without creating hot spots, the heat absorption rate of the hotplate members and the product being cooked can readily be matched by adjusting the outlet rate of the gases emitted from the lances. Furthermore, if the cooking procedure requires different temperatures at different times, suitable thermostatic controls, not shown, may be installed for independently controlling the temperature of the gases emitted from the burner mixing units 92 and 94 which are spaced along the path of travel of the hotplate members. In addition, thermostatic control units, not shown, may be installed for actuating the control valves 118 and 168 in order to independently maintain the desired temperatures of the lower and upper hotplate members.

While a preferred embodiment of the present invention has been shown and described herein, it is obvious that many changes may be made without departing from the spirit and scope of the appended claims. For example, the members to be heated may have shapes other than the substantially flat griddle configurations disclosed herein and the hot air lances of the present invention may be made circular or any other desired shape in order to conform to the shape of the member to be heated. Furthermore, dilution gases other than air may be used. As an example, steam or nitrogen can be introduced into the burner heater unit in the place of or in addition to the dilution air in order to control the humidity or atmosphere surrounding the articles being cooked.

The invention is claimed as follows:

1. An apparatus for cooking food of the type described comprising a food support member movable along a path of travel, hot gas mixture lance means disposed adjacent said path of travel and having a plurality of spaced apart outlet openings for directing high velocity streams of a hot gas mixture against said member while the member moves along said path of travel, a heater unit having inlet means and an outlet, means for delivering gases to be heated under pressure into said inlet means and means connecting said heater outlet with said lance means.

2. An apparatus, as defined in claim 1, wherein said heater unit comprises a combined burner heater unit, and said means for delivering gases to be heated comprises means for delivering a combustible mixture of gases to the inlet means of the burner heater unit, and additional means for delivering dilution gases into the burner heater unit for mixing with products of combustion therein and providing a gas mixture having a temperature less than the temperature of the products of combustion.

3. An apparatus, as defined in claim 2, which includes control means for varying the ratio of the dilution gases and the products of combustion for controlling the temperature of the resulting gas mixture.

4. An apparatus, as defined in claim 1, wherein said gas mixture lance means comprises an elongated tubular member having an inlet communicating with said means connecting the lance means to the heater unit, said spaced apart outlet opening being in and spaced along said tubular member in a direction extending from said inlet.

5. An apparatus, as defined in claim 4, wherein said outlet openings in said tubular member are arranged in a plurality of rows.

6. An apparatus, as defined in claim 5, wherein said outlet openings in said rows are disposed in diverging relationship with respect to each other.

7. An apparatus, as defined in claim 1, wherein said means connecting said heater unit with said lance means comprises a manifold member extending transversely of said path of travel, said lance means including a plurality of elongated tubular members having inlet ends connected with said manifold member and extending therefrom along said path of travel.

8. An apparatus, as defined in claim 7, wherein said lance means comprises a plurality of tubular members respectively having inlet ends connected with opposite sides of said manifold member and extending in opposite directions from said manifold member along said path of travel.

9. An apparatus, as defined in claim 1, wherein said food support member has a predetermined configuration, and said lance means has a configuration corresponding to said predetermined configuration.

References Cited

UNITED STATES PATENTS

| | | | |
|---|---|---|---|
| 1,732,262 | 10/1929 | Dumbleton | 107—57 |
| 2,256,003 | 9/1941 | Patterson | 107—57 |
| 2,501,765 | 3/1950 | Dumbleton et al. | 107—57 |
| 2,819,691 | 1/1958 | Schlicksupp | 99—373 XR |
| 3,065,079 | 11/1962 | Elliott | 99—386 XR |
| 3,245,356 | 4/1966 | Jimenez et al. | 107—57 |
| 3,372,635 | 3/1968 | Meyer | 99—386 XR |

BILLY J. WILHITE, Primary Examiner

U.S. Cl. X.R.

99—373, 374, 427, 443; 263—19